(12) United States Patent
Methley

(10) Patent No.: US 6,591,800 B1
(45) Date of Patent: Jul. 15, 2003

(54) PHASE CHANGE MECHANISM

(75) Inventor: Ian Methley, Oxfordshire (GB)

(73) Assignee: Mechadyne PLC, Oxfordshire (GB)

( * ) Notice: Subject to any disclaimer, the term of this patent is extended or adjusted under 35 U.S.C. 154(b) by 0 days.

(21) Appl. No.: 10/088,565

(22) PCT Filed: Sep. 19, 2000

(86) PCT No.: PCT/GB00/03595

§ 371 (c)(1),
(2), (4) Date: Mar. 15, 2002

(87) PCT Pub. No.: WO01/23713

PCT Pub. Date: Apr. 5, 2001

(30) Foreign Application Priority Data

Sep. 29, 1999 (GB) .............................. 9922925

(51) Int. Cl.[7] .................................. F01L 1/34
(52) U.S. Cl. ............... 123/90.17; 192/93 A; 123/90.15
(58) Field of Search ........................... 123/90.15, 90.16, 123/90.17; 192/38, 54.52, 93 A

(56) References Cited

U.S. PATENT DOCUMENTS 5,161,493 A * 11/1992 Ma ........................ 123/90.17
5,261,360 A * 11/1993 Voll et al. ................ 123/90.17

FOREIGN PATENT DOCUMENTS

| DE | 199 21 667 | 11/2000 |
|---|---|---|
| EP | 0 558 198 | 9/1993 |

* cited by examiner

*Primary Examiner*—Thomas Denion
*Assistant Examiner*—Jaime Corrigan
(74) *Attorney, Agent, or Firm*—Smith-Hill and Bedell

(57) ABSTRACT

A phase change mechanism is disclosed for enabling the phase of an engine camshaft to be changed in relation to the engine crankshaft. The mechanism comprises a drive member connectable for rotation with the engine crankshaft, a driven member connectable for rotation with the engine camshaft and two oppositely acting one-way clutches for transmitting torque from the drive member to the driven member. In the invention, either one of the one-way clutches may be selectively disengaged at a time by hydraulically lifting a roller of its ramp surface to allow the drive member to slip relative to the driven member under the action of the periodic reversal of the reaction torque of the camshaft during engine operation.

8 Claims, 3 Drawing Sheets

PHASE CHANGE MECHANISM

FIELD OF THE INVENTION

The present invention relates to a phase change mechanism.

BACKGROUND OF THE INVENTION

A phase change mechanism is known for enabling the phase of an engine camshaft to be changed in relation to the engine crankshaft. The known mechanism comprises a drive member connectable for rotation with the engine crankshaft, a driven member connectable for rotation with the engine camshaft and two oppositely acting one-way clutches for transmitting torque from the drive member to the driven member. To bring about a phase change, means are provided for selectively disengaging one of the one-way clutches at a time. This allows the drive member to slip relative to the driven member in the desired direction as a result of the periodic reversal of the reaction torque of the camshaft during engine operation.

In the known phase change mechanism, the means for disengaging one of the two one-way clutches at a time acted mechanically on the components to the clutch and a complex control system was required for setting the desired of the drive member relative to the driven member.

SUMMARY OF THE INVENTION

According to the present invention, there is provided a phase change mechanism for enabling the phase of an engine camshaft to be changed in relation to the engine crankshaft, the mechanism comprising a drive member connectable for rotation with the engine crankshaft, a driven member connectable for rotation with the engine camshaft, two oppositely acting one-way clutches for transmitting torque from the drive member to the driven member, and means for, applying hydraulic pressure directly to the locking elements of the one-way clutches for selectively, disengaging one of the one way clutches at time to allow the drive member to slip relative to the driven member solely under the action of the periodic reversal of the reaction torque of the camshaft during engine operation.

The two one-way clutches may suitably be constituted by at least one pair of cylindrical rollers serving as the locking elements and arranged between a cylindrical race on one of the members and tow ramp surfaces on the other member, the rollers being urged apart by a spring that acts to wedge each roller between the cylindrical race and a respective one of the ramp surfaces.

The means for disengaging each clutch preferably comprise means for subjecting one of the rollers of each pair to hydraulic pressure on its opposite side from the spring so as to move the roller away from wedging contact with the respective ramped surface.

BRIEF DESCRIPTION OF THE DRAWINGS

THE invention will now be described further, by way of example, with reference to the accompanying drawings, in which.

DETAILED DESCRIPTION OF THE PREFERRED EMBODIMENT

Figure 1:
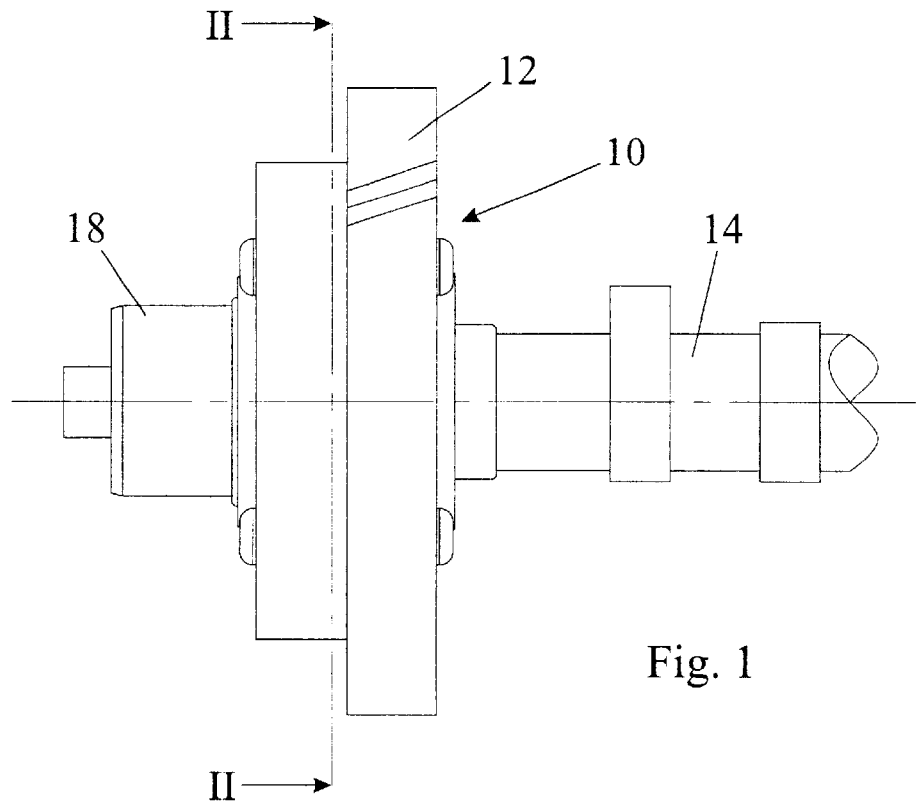
FIG. 1 is a side view of a phase change mechanism, embodying the invention.

The drawings show a phase change mechanism 10 having a, drive member 12 in the form of helical gear that meshes directly with a helical gear drive by the crankshaft. It is alternatively possible for the drive member 12 to be driven by means of a belt or a chain. Torque is applied to the drive member 12 by means of an internally toothed belt (not shown) that passes over a second toothed pulley on the crankshaft. The driven member 18 of the phase change mechanism 10 is secured to a camshaft 14 by means of a bolt 20. The driven member 18 is held fast in rotation with the camshaft 14 by means of a key 16. Two end flanges 70 and 74 are secured by means of bolts 72 and 76 to the driven member 18 and these engage and seal against shoulders on the radially inner surface of the drive member 12 so that the drive member is retained axially relative to the driven member 18 but can rotate relative to the driven member about the flanges 70 and 74.

Figure 2:
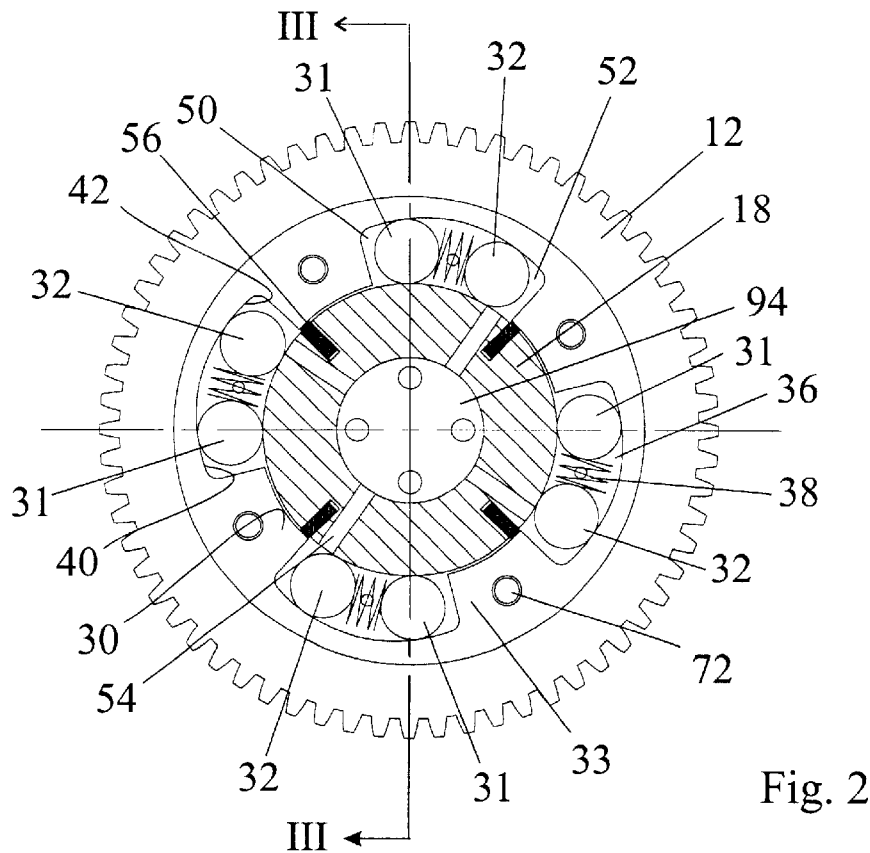
FIG. 2 is a section along the line II—II in FIG. 1, showing the mechanism in a position to retard the phase between the drive and driven members.
Figure 3:
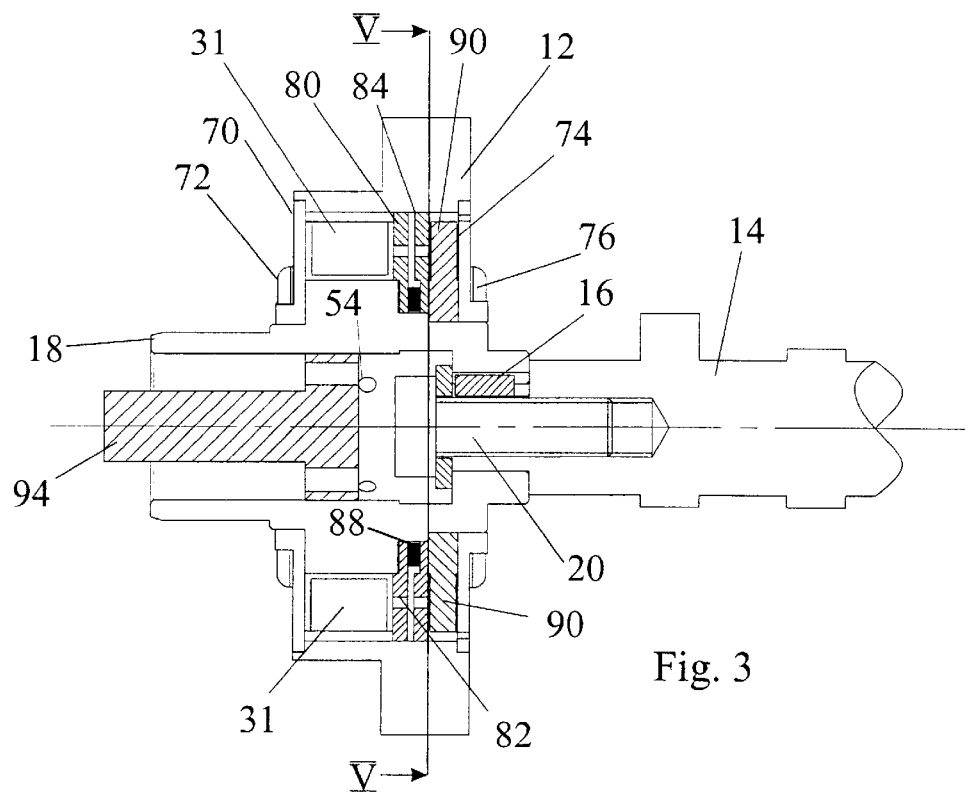
FIG. 3 is a section along the line III—III in FIG. 2.
Figure 4:
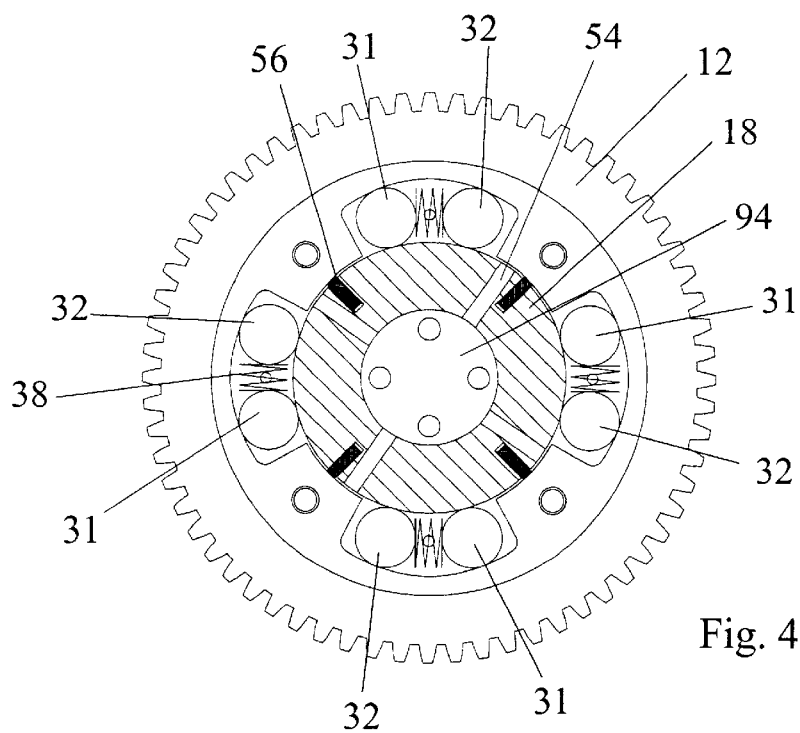
FIG. 4 is a section similar to that of FIG. 2, showing the mechanism in the middle of its operating range.

Transmission of torque from drive member 12 to the driven member 18 is effected by means of two one-way clutches (also termed over-running clutches) the operation of which is best understood from FIGS. 2 and 4. The driven member 18 has a cylindrically smooth race surface 30 that is engaged by pairs of rollers 31, 32, there being four such pairs in the illustrated embodiment. Each pair of rollers 31, 32 is located within a radial recess 36 on the inner surface of a ring 33 formed integrally with the drive member 12. Each recess 36 includes two ramp surfaces 40 and 42 that face towards the cylindrical race surface 30 on the driven member 18. The two surfaces 40 and 42 are ramped in opposite directions so that the radial dimension of each recess 36 is greater at its center than at its ends. A spring 38 between the rollers 32 urges them towards the narrow ends of the recesses 36 to wedge them between the cylindrical race surface 30 and the ramp surfaces 40, 42, so that they act as locking elements.

With both the rollers 31, 32 of each pair in a wedged position, the drive and driven members 12 and 18 are locked together for rotation with one another regardless of the direction in which torque is applied if however one of the rollers 31, 32 is in some way moved towards the center of the recess 36 against the action of its spring 38, then torque will be transmitted in one direction by the other roller but there will be slip in the opposite direction.

During normal operation of an engine, the camshaft is subjected to torque reversals. This is because the cams of the camshaft act on valve stems that are spring biased. When a cam is opening a valve, it meets resistance and the force of the valve spring on the leading ramp of the cam acts to decelerate the member driving the camshaft. On the other hand, when a spring is attempting to close a valve and is prevented from doing so by the camshaft, the valve spring acts on the trailing ramp of the cam in a direction to accelerate the member driving the camshaft. Because of this periodic reversal of the reaction torque, if one of the one-way clutches is rendered inoperative by raising its set of rollers off their ramp surfaces, the phase change mechanism will be driven in the appropriate direction to advance or retard the phase of the driven member relative to the drive member.

In the present invention, each rollers 31, 32 can be moved away from its ramp surfaces 40, 42 against the action of the spring 38 by applying a hydraulic pressure to the chamber 50 or 52 lying between the roller 31, 32 and the end of the recess 36.

To this end, the driven member 18 has two sets of bores 54 that are axially offset from one another, one set (shown in FIGS. 2 and 4) communicating with chambers 50 at the counter clockwise ends of the recesses 36 and the other set (not visible in the plane of the section in FIGS. 2 and 4) communicating with the chambers 52 at the clockwise ends of the recesses 360. Sealing veins 56 that lie radially between the two sets of bores 54 are arranged between the driven member 18 and the radially inner surface of the ring 33 to seal off the chambers 50, 52 at one end, while the rollers 31, 32 seal off the chambers at the other end.

The drive and driven members are shown in one of their two end positions in FIG. 2 and in a central position relative to one another in FIG. 4. If, while in the position shown in FIG. 2, hydraulic pressure is applied to the bores 54, the hydraulic fluid will flow into the chambers 52 lifting the rollers 32 at the clockwise ends of the recesses 36 off their ramp surfaces 42. This will allow the drive member 12 to slip anticlockwise, as viewed, in relation to the driven member 18 until it at first reaches the central position shown in FIG. 4. It will then continue to slip to the other end position in which the sealing veins reach the clockwise ends of the recesses 36. In this position, the second set of bores can be pressurised to free the other set of rollers 31 and cause the drove member 12 to slip clockwise relative to the driven member 18 under the action of the torque reversals.

One axial end of the variable volume chambers 50 and 52 is sealed by means of the flange 70. The other axial end is sealed by means of a plate 80 that has drainage holes 76 for relieving the hydraulic pressure from the spaces between each pair or rollers 31, 32.

Figure 5:
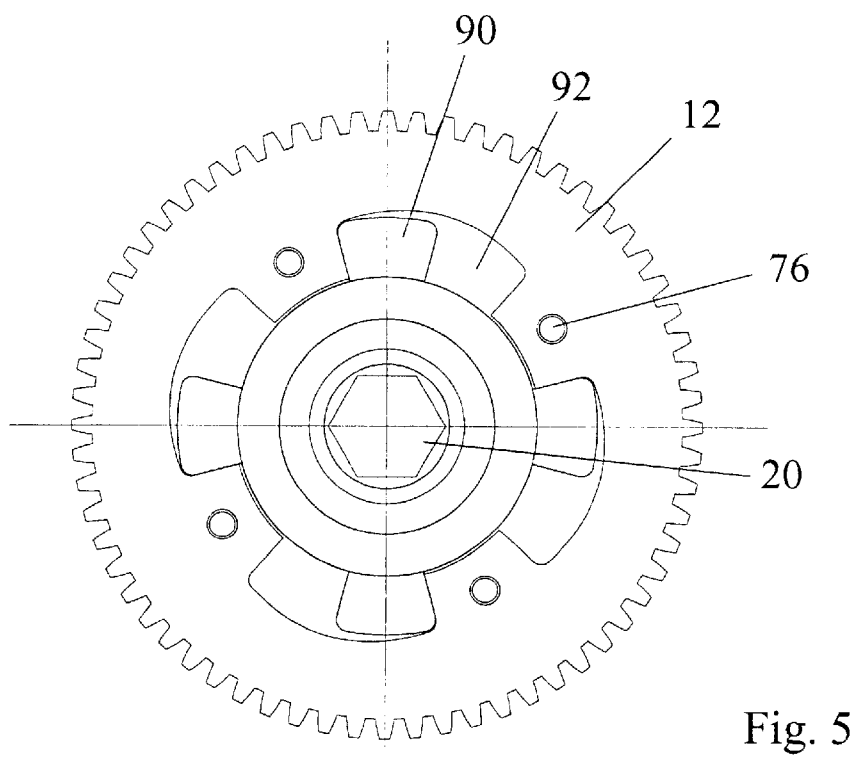
FIG. 5 is a section along the line V—V in Figure 3.
Figure 6:
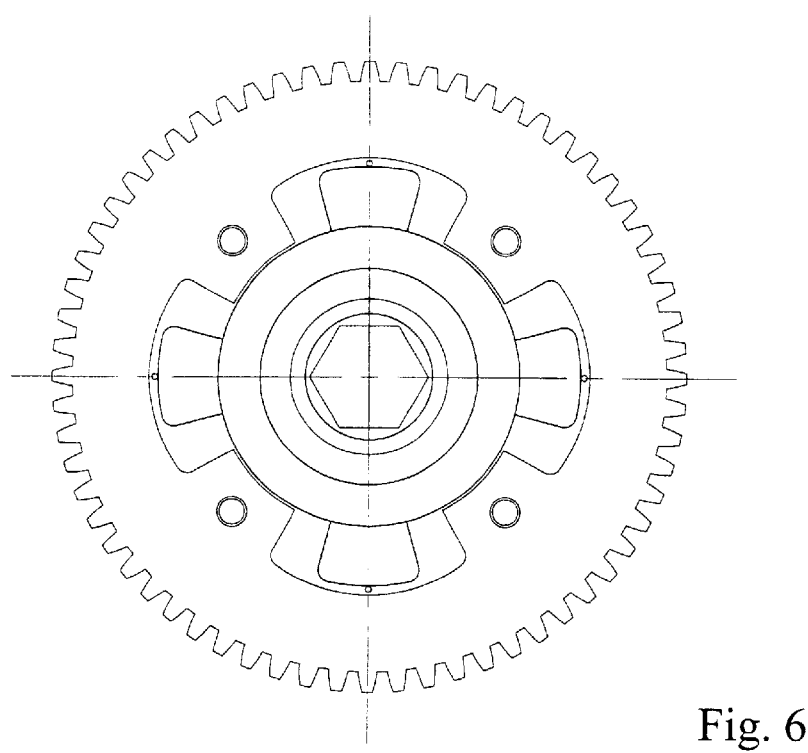
FIG. 6 is a section similar to that of FIG. 5 showing the mechanism in a position to retard the phase between the drive and driven members.

The flange 74 at the other axial end of the drive member 12 forms part of a hydraulic damping arrangement to limit the rate at which the phase between the drive and driven members can be changed and that also acts as a stop to limit the extent to which the relative phase may be changed. The damping arrangement, that is best understood from FIG. 6 and 5, comprises a set of radial veins 90 that are fast in rotation with the driven member 18 and recesses 92 on the inner surface of the drive member 12 having a shape resembling that resemble the recesses 36. The abutment of the veins 90 with the ends of the recesses limits the extent to which the driven member can rotate relative to the drive member. Furthermore, as the veins 90 rotate, they displace hydraulic fluid from one side of the recess 92 to the other through the small radial gap between the veins 90 and the recesses 92 and this damps the rate of movement of the driven member 18 relative to the drive member 12.

The damping chambers in the recesses 92 are closed off at one axial end by the cover flange 74 and at the other end by a second plate 84, similar to the plate 80, the plates 80 and 84 being urged in opposite direction by a corrugated spring washer 88 that is arranged between them.

To control the flow of hydraulic fluid to the two sets of bores 54, a valve spool 94 is arranged centrally within the driven member 18 and is movable axially to expose the inner ends of one of the two sets of bores 54 at a time. In its intermediate position, the spool 94 isolates both sets of bores 54 from the pressure supply that is connected to the axial end of the driven member 18.

The illustrated mechanism may act either as a two position device or a continuously variable device. In the former case, the spool 94 is moved to one or other of its end positions and this will result in the phase being fully advanced or fully retarded. For continuous control of the phase, it is possible to provide a close loop control system that parks the spool 94 in its intermediate position when the phase is at the desired setting and that moves the spool in the appropriate direction when an error is measured between the desired and actual settings of the phase.

It is an important advantage of relying on hydraulic pressure acting directly on the locking elements of the one-way clutches to disengage them that one can dispense with the need for a cage, thereby simplifying the construction and assembly of the mechanism.

What is claimed is:

1. A phase change mechanism for enabling the phase of an engine camshaft to be changed in relation to the engine crankshaft, the mechanism comprising a drive member connectable for rotation with the engine crankshaft, a driven member connectable for rotation with the engine camshaft, two oppositely acting one-way clutches for transmitting torque from the drive member to the driven member, means for applying hydraulic pressure directly to locking elements of the one-way clutches for selectively disengaging one of the one-way clutches at a time to allow the drive member to slip relative to the driven member solely under the action of the periodic reversal of the reaction torque of the camshaft during engine operation, and hydraulic damping means for limiting the rate of rotation of the drive member relative to the driven member.

2. A phase change mechanism as claimed in claim 1, wherein the hydraulic damping means serve additionally to limit the degree of permissible movement of the driven member relative to the drive member.

3. A phase change mechanism as claimed in claim 2, wherein the hydraulic damping means comprises radial vanes that are fast in rotation with the driven member movable within an oil filled recess formed in the drive member.

4. A phase change mechanism for enabling the phase of an engine camshaft to be changed in relation to the engine crankshaft, the mechanism comprising a drive member connectable for rotation with the engine crankshaft, a driven member connectable for rotation with the engine camshaft, two oppositely acting one-way clutches for transmitting torque from the drive member to the driven member, means for applying hydraulic pressure directly to locking elements of the one-way clutches for selectively disengaging one of the one-way clutches at a time to allow the drive member to slip relative to the driven member solely under the action of the periodic reversal of the reaction torque of the camshaft during engine operation, wherein the two one-way clutches are constituted by at least one pair of cylindrical rollers acting as the locking elements and arranged between a cylindrical race on one of the members and two ramp surfaces on the other member, the rollers being urged apart by a-spring that acts to wedge each roller between the cylindrical race and a respective one of the ramp surfaces.

5. A phase change mechanism as claimed in claim 4, wherein the means for disengaging each clutch comprises means for subjecting one of the rollers of each pair to hydraulic pressure on its opposite side from the spring so as to move the roller away from wedging contact with the respective ramped surface.

6. A phase change mechanism as claimed in claim 4, comprising hydraulic damping means for limiting the rate of rotation of the drive member relative to the driven member.

7. A phase change mechanism as claimed in claim 6, wherein the hydraulic damping means serve additionally to limit the degree of permissible movement of the driven member relative to the drive member.

8. A phase change mechanism as claimed in claim 6, wherein the hydraulic damping means comprises radial vanes that are fast in rotation with the driven member movable within an oil filled recess formed in the drive member.

* * * * *